US006848104B1

(12) United States Patent
Van Ee et al.

(10) Patent No.: US 6,848,104 B1
(45) Date of Patent: Jan. 25, 2005

(54) CLUSTERING OF TASK-ASSOCIATED OBJECTS FOR EFFECTING TASKS AMONG A SYSTEM AND ITS ENVIRONMENTAL DEVICES

(75) Inventors: Jan Van Ee, Cupertino, CA (US); Yevgeniy Eugene Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/217,414

(22) Filed: Dec. 21, 1998

(51) Int. Cl.[7] ............................................... G06F 9/00
(52) U.S. Cl. ...................... 719/310; 718/108; 709/224; 345/708; 345/736
(58) Field of Search ................................ 709/328, 332

(56) References Cited

U.S. PATENT DOCUMENTS

| 5,367,316 A | 11/1994 | Ikesaki ........................ 345/158 |
| 5,590,831 A | 1/1997 | Manson et al. ................ 236/51 |
| 6,130,726 A * | 10/2000 | Darbee et al. .............. 348/734 |
| 6,288,716 B1 * | 9/2001 | Humpleman et al. ........ 345/329 |

FOREIGN PATENT DOCUMENTS

| JP | 08314680 A | 11/1996 | ............. G06F/3/14 |
| WO | 98/485555 | 10/1998 | ............. H04M/1/57 |

* cited by examiner

Primary Examiner—Meng-Al T. An
Assistant Examiner—The Thanh Ho
(74) Attorney, Agent, or Firm—Chris Horgan

(57) ABSTRACT

Tasking systems and methods are provided that support user interfaces for displaying objects, the displayed objects enabling user access to resources that provide for effecting tasks among the system and devices of the systems' environment. More particularly, tasking systems and methods are provided that support the foregoing features, wherein the systems and methods support clustering operations respecting such task-associated objects so as to enhance the effecting of the associated tasks, such clustering operations responding to context. The clustering operations preferably are both adaptive and dynamic. Tasking systems and methods preferably support the tracking of selected states, including, as examples, one or more of environment states, device states, and system states. Tracked states typically also include states respecting other relevant criteria, such as temporal criteria.

30 Claims, 4 Drawing Sheets

CLUSTERING OF TASK-ASSOCIATED OBJECTS FOR EFFECTING TASKS AMONG A SYSTEM AND ITS ENVIRONMENTAL DEVICES

BACKGROUND

The present invention relates to tasking systems and methods supporting user interfaces for displaying objects, the displayed objects enabling user access to resources that provide for effecting tasks among a system and devices of the system's environment. More particularly, the present invention relates to tasking systems and methods having the foregoing features, wherein the systems support dynamic and adaptive clustering operations respecting such objects so as to enhance effecting of the associated tasks, such clustering operations responding to context.

Universal remotes are known. These remotes typically provide for controlling an environment and devices thereof. To do so, the remotes transmit, e.g., commands based on standardized communication protocols, which commands correspond to control functions and operations of the controlled devices. Generally, the remotes have compact dimensions, so as enable the user to easily grasp and hold the remote in one hand.

Conventional universal remotes tend to rely principally on permanent keys. The keys typically are dedicated in that each corresponds to a particular function or operation of one external device. As such, the keys generally have permanent legends that identify the correspondence. Moreover, the number of keys is constrained by the remotes' compact, physical dimensions.

Some universal remotes employ screens, such as liquid crystal displays. Generally, these screens enable the remotes to be programmed. In one category, the screen provides a programmable legend to accompany a programmable, permanent (i.e., hard) key. In another category, the screen provides both a programmable legend and a programmable, virtual (i.e., soft) key—the virtual key being implemented as an icon displayed on the screen, the icon being actuable through the screen's touch sensitivity. In both categories, the number of keys typically remains constrained by the remote's compact dimensions, particularly due to the screen's limited dimensions. Moreover, once the keys are programmed, the keys and their respective legends typically are effectively permanent with respect to their disposition and their correspondence to an external device's function/operation. This permanence applies, at least in a presentation sense, where the programmed keys are organized in conventional menus.

A universal remote's efficacy is characterized, generally, by the number of devices (and associated functions/operations) the remote can simultaneously support. That is, on a first level, a remote's efficacy tends to increase with increases in the number of available keys. However, the number of keys and, therefore, the remote's efficacy tend to be limited by the remote's dimensional constraints.

Moreover, a remote's efficacy tends to plateau and even diminish, respectively, as the number of keys rises to, and then exceeds, some ergonomic threshold. That is, on a second level, a remote's efficacy may cease to increase once the number of keys leads to user perception of unacceptable burden and/or complexity. Indeed, with actual or perceived burden and complexity, a remote's efficacy will tend to diminish, particularly if the users' inclination and ability to use the remote declines. Such efficacy problems may not be overcome entirely by employing programmable keys, including virtual keys organized in conventional menus, in that, e.g., these solutions may simply be insufficient to counteract perceptions of, or actual, burden and complexity.

Conventional universal remotes also fall short in the types of products and product categories that they support. Supported devices typically are limited to TVs, VCRs, receivers, audio CD players and other audio and video equipment. In addition, however, devices increasingly will include many more products from a broader range of categories. The devices may, or already, include, without exhaustion, home air conditioning/heating systems and controllers therefor, lighting systems, personal computers and peripherals, home and automobile security systems, kitchen appliances, and other home, business, automobile, and entertainment products and systems.

As another example, supported devices are coming to include, or already include, resources that generally have not been so included. These resources include, without exhaustion, (i) web browsers and other communication clients and/or applications (e.g., capable of delivering, transmitting, processing and otherwise supporting electronic program guides, data, email, voice, or other media/information), (ii) communication connections (e.g., switched, cellular and IP telephony; Internets; Intranets; hypertext services, such as the World Wide Web; and LANs, WANs and other networks), and (iii) software applications (e.g., note pads, planners, and input facilities).

Some of these resources, particularly those that are communication- or computing-related, seem to be becoming ubiquitous. This, of itself, may engender problems, including the physical location of any remote. As an example, the computing-related resources are now available, or are becoming available, in compact form factors, e.g., personal digital assistants (PDAs), such as the VELO and NINO by Philips Electronics and PALM PILOT by 3Com. As another example, embedded electronics—in the form of a processor, a program and other hardware and software—empower engineers to add communication and computing capabilities essentially throughout a user's environment. In either case, conventional remotes would tend to be inadequate for providing sufficient access of/to these resources. In each case, a conventional remote not only fails to support the environmental devices, but presents problems as to how to implement the remote (e.g., location) even if support were to be provided.

Conventional universal remotes have additional shortcomings. As an example, the remotes generally do not provide for receiving signals, e.g., from and about the supported devices. As another example, other than the legends associated with the keys, these remotes tend to omit facility for conveying information to users—visual, audible or otherwise—pertaining arty to an applicable environment or the supported devices therein. These remotes, in particular, typically fail to provide adequately, if at all, for displaying or otherwise conveying relevant (e.g., locationally relevant or dependent) information to the user.

While conventional remotes may have shortfalls, other solutions tend to combine advantages with limitations. For example, instead of a conventional remote, a PDA may be configured (a) to support one or more standard infrared communication capabilities and (b) to display, via a user interface, a large variety of touch-sensitive icons, typically in a conventional hierarchy of menus, as well as other features provided by an applicable, commercial operating system ("OS"). However, with any such OS, to work with even a small number of supported devices and/or functions/ operations, the user may need to open multiple menus or step through a plurality of other OS features, in order to access any particular function/operation of any particular environmental device. This is undesirable because, as menus and features are opened to activate a function/operation, a PDA's screen tends to become ever more cluttered due to its limited dimensions, such clutter making it increasingly difficult for the user to navigate to and activate other devices or functions/operations. Moreover, this navigational difficulty tends to overwhelm users seeking to activate several functions/operations simultaneously or in sequence.

Accordingly, there is a need to overcome problems inherent in apparatus, systems and methods for tasking supported devices in an environment, including those problems of the prior art as described above, so as to enable enhanced and new functionality, particularly in the event of plural supported devices, each tending to have associated therewith plural functions/operations.

SUMMARY

The present invention overcomes problems inherent in the prior art, including those associated with conventional remotes, by providing tasking systems and methods supporting user interfaces for displaying objects, the displayed objects enabling user access to resources that provide for effecting tasks among a system and devices of the system's environment. More particularly, the present invention provides tasking systems and methods having the foregoing features, wherein the systems and methods support clustering operations respecting such objects so as to enhance effecting of the associated tasks, such clustering operations responding to context. Generally, tasking systems and methods support clustering operations, both adaptively and dynamically. Toward providing such features, tasking systems and methods preferably support the tracking of selected states, including, as examples, one or more of environment states, device states, and system states. Tracking typically also is directed to states respecting other relevant criteria, such as temporal criteria.

In one embodiment, a tasking system comprises a tasking software system operating on/among one or more implementing mechanisms. Implementing mechanisms can be portable, semi-portable, or of fixed location, and can be variously realized, including, e.g, as a remote control unit, a hand-held computer, a personal computer, a workstation or server computer, some other computing device, or some other communicating device. Implementing mechanisms typically comprise various resources that, based on user selection of objects, provide for effecting the tasks associated with environmental devices. The resources generally include an operating system, collateral software, communication facilities, processing facilities, a memory system, input facilities (e.g., a pointing device, hard buttons, a microphone, a key pad or the like, or combinations thereof), and a display screen, in selected combination(s). Typically, the screen and an input facility are integrated, e.g. as a touch-sensitive LCD.

In one aspect, the system is implemented in handheld form factors, such as enhanced remote control devices or personal digital assistants. The invention is particularly suited for such form factors in that the screens common to such form factors tend to become readily cluttered with information, which circumstance the invention is directed, in part, to overcome.

In another aspect, the tasking software system enables effecting tasks among the system and one or more environmental devices through task-associated user-selectable objects. To do so, the software system typically comprises: (a) a cluster formulation subsystem; (b) a cluster presentation subsystem; (c) a transition subsystem; (d) a state tracking subsystem; (e) an object discovery subsystem; (f) a help subsystem and (g) other subsystems. The cluster formulation subsystem formulates and re-formulates the clusters (each cluster comprising selected objects), responsive to context and preferably on an adaptive and dynamic basis. The cluster presentation subsystem supports the formatting and presentation of objects of an active, formulated (or reformulated) cluster, also preferably responsive to context and on an adaptive and dynamic basis. The transition subsystem supports transitions among clusters and among formats/presentations of an active cluster. The state tracking subsystem supports context determination by gathering data respecting one or more of environmental, device, system and other states. The object discovery subsystem supports the discovery of environmental devices which are available and/or not available. The help subsystem supports user interaction with the tasking system, including, as examples, one or more of the user's configuring preferences, analyzing such configurations against existing clusters and prescribed clustering approaches, identifying conflicts and other problems based on such analysis and otherwise providing feedback/feed-forward in proper and/or efficient employ of the tasking system.

Each of the respective subsystems generally operates in conjunction with the implementing mechanism and its resources. As an example, the cluster presentation subsystem typically cooperates with the operating system, particularly the user interface thereof, and screen of the implementing mechanism in presenting clusters of objects. As another example, if the tasking software system comprises a user-recognition subsystem, such subsystem typically cooperates with resources including, as examples, one or more of (a) the memory system, wherein user data is stored, such as registration data (e.g., names, birth dates, passwords, and the like), biometric data (e.g., voice or finger print(s), grip pressure, hand temperature, etc.) and/or use signatures (e.g., usage habits that distinguish each user) and (b) input facilities (e.g., microphone, fingerprint scanner, pressure transducer, and thermometer). As yet another example, if the tasking software system comprises a mechanism positioning system, such positioning system typically cooperates with resources including the communication facilities (e.g., so as to receive telemetry data from environmental devices or global positioning signals) and/or signal strength resources (e.g., to determine environment or position in an environment based thereon, typically in triangulation).

The present invention also provides a tasking method. The method preferably is a implemented using a tasking software system that operates on and in conjunction with an implementing mechanism. The method supports effecting tasks among the tasking system and environmental devices by user selection of associated objects.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

BRIEF DESCRIPTION OF THE DRAWINGS

The drawings, all according to the present invention, include.

DETAILED DESCRIPTION

Overview

Figure 1:
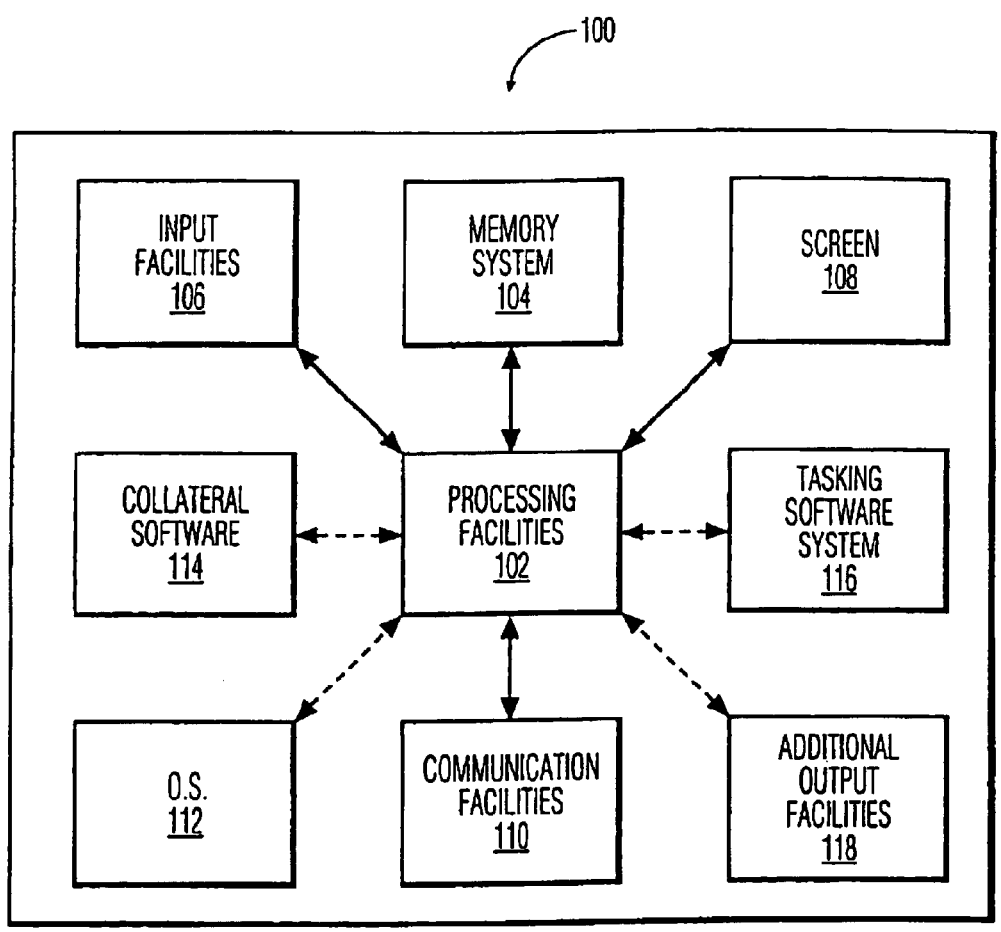
FIG. 1 illustrates an embodiment of an implementing mechanism, by example resources.

The present invention comprises tasking systems supporting user interfaces for displaying objects, the displayed objects enabling user access to resources that provide for effecting tasks among the system and devices of the systems' environment ("environmental devices"). More particularly, the present invention comprises tasking systems having the foregoing features, wherein the systems support clustering operations respecting such objects so as to enhance effecting of the associated tasks, such clustering operations responding to context. Generally, tasking systems support clustering operations, both adaptively and dynamically. Toward providing such features, tasking systems preferably support the tracking of selected states, including, as examples, one or more of environment, device, system and temporal states.

In this specification, the term "environment" embraces any combination of living (e.g., rooms in a home), work (e.g., an office, conference room or cubicle hive), shopping (e.g., malls), recreation (e.g., a gym, ballpark or stadium), transportation (e.g., inside automobiles and along roads, bike paths and sidewalks), public (e.g. a park or town square), civic (e.g., a government building or convention center) or other areas, sites or locations, inside or outside. While the above environments typically are physical, it is to be understood that all or part of the environment can be logical (e.g., computer desktop, software applications, Internet and World Wide Web locations).

Also, in this specification, the term "object" refers to icons, buttons, dialogue boxes, box entries, components, menus, submenus, menu items, controls, configuration and preference values, images, sounds, as well as similar information, alone and in various combinations. Each object generally is associated, directly or indirectly, with one or more tasks of one or more environmental devices. Objects generally are subject to clustering, as described herein. Objects are also subject to formatting by and among one or more object types. (Note that certain objects are deemed meta-objects as these, typically, relate to the user interface, rather than to tasking.)

Moreover, the terms "clustering operations", "cluster" and "clustering" (and any other variants thereof) refer, generally, to the grouping, relative disposition, sequencing, ordering, layering, organizing and other forms of collection of and among certain objects and/or sets of objects, as well as the formatting and presentation of clusters, for display during any circumstantial instance (e.g., characterized by a point or range of time), or update thereto, such display being via a user interface ("UI"), such as a graphical user interface ("GUI"), wherein such collection responds to context. Toward further explication, objects are, become or tend to become clustered (or unclustered/reclustered), in accordance with the invention, based on contextual gravity thereamong, such gravity typically having temporal (e.g., historic, current, trending and transitory) aspects and being characterized by relative significance and attraction between and among certain objects according to, as examples, (i) the tasks with which the objects are associated, (ii) the environment or sequence of environments, (iii) the available environmental devices or the devices that may become available by anticipatable environmental changes, (iv) the states of devices, (v) the user and the user's specified preferences, and (vi) the user's past behavior in the environment and anticipatable environments, e.g., respecting implicated devices and the selection of associated tasks. (It is to be understood that the use of the above cluster-based terms and variants thereof can refer to individual or combinations of the above operation, where the context can indicate same either directly or indirectly, expressly or impliedly).

In one general aspect, tasking systems according to the present invention support clustering operations on a dynamic basis, e.g., continuously, substantially continuously, at regular intervals and/or responsive to selected events. In another general aspect, tasking systems according to the present invention support clustering operations on an adaptive, e.g., based on one or more of available environmental devices, users' configuring preferences and sets of preferences, and past user selections and sets of selections, in each case by the present and historical relationships and trends thereamong. In yet another aspect, tasking systems support clustering operations both dynamically and adaptively. In any case, a tasking system preferably is configured, among other things, to perform clustering operations responsive to selected context, so as to enable the user to quickly, easily, pleasurably, efficiently and otherwise optimally select desired and appropriate objects and, thereby, effect tasks among the tasking system and environmental devices. That is, through clustering operations, tasking systems according to the present invention preferably provide for minimal, reduced or optimally reduced user interaction therewith vis a vis a task, such as in finding, understanding and selecting one or more objects that are relevant to a desired task.

An environment is described variously. To illustrate, an environment is described by logical and physical constructs. Physically, an active environment typically embraces the area(s) within which the tasking system is enabled to communicate to environmental devices. As an example, a tasking system's range of communication (via, e.g., microwave, infrared or RF wireless carrier generally) is limited by various factors, such as transmissions powers, line or sight limitations and interference characteristics. At the same time, the tasking system's range of communication (via, e.g., wired solutions) may be determined to be extensive, such as in the case of an Internet. As such, an applicable environment may be intentionally limited in scope to less than its potential.

Logically, an active environment can be characterized by various parameters. As an example, the environmental devices may have temporal parameters. These parameters may have various scope including, without exhaustion, as to availability, features/operations enabled and user(s) authorized to effect tasks. To illustrate, a TV may be physically present in a bedroom, but may not be available to a particular user during selected hours on selected days and, even when available, that user may be blocked from selecting one or more channels and/or from adjusting the volume. As another example, the environmental devices may have relational parameters. These parameters may have various scope including, without exhaustion, as to either/both availability and features/operations enabled. To continue the above TV illustration, use of the TV may block use of the VCR or telephone, or use of the video tape player ("VTP") may enable use of the otherwise-blocked TV, but require the TV to be in VTP mode only.

A particular environment of among other environments is described as "active" if it is that environment to which the user's most recent selection pertains. Moreover, from the active environment, the user typically can render other environments active. In turn, the tasking system preferably is enabled pass among environments either/both by physical movement and by remote projection. As to physical passages, the tasking system preferably is enabled to anticipate or recognize the change in environments: anticipation being based, e.g., on user selections; and recognition being based, e.g., on device discovery, communication signal strength, global positioning system, user notice, or otherwise. As to remote projection passages, the tasking system preferably is enabled to anticipate or recognize the change in environments: anticipation being based, e.g., on user selections; and recognition being based, e.g., on user notice. Notwithstanding the above, it is contemplated that the tasking system enables the user to select an object as to an inactive environment, so that the associated task is effected either immediately, substantially immediately, based on some later event (e.g., when in the other environment), or otherwise at some later time.

Environmental devices in accordance with the invention have a wide breadth, contemplating both the physical and the logical. Typical devices include, without exhaustion, (a) TVs, VCRs, receivers, audio CD players and other audio and video equipment, (b) ventilation, air conditioning and heating systems, via thermostats, control panels and the like, (c) lighting systems, (d) computing devices, components and peripherals, (e) security, safety, and positioning systems, (f) home appliances and tools, (g) health care instruments and equipment, (h) telephone, dictation, copying, faxing and other office equipment, (i) machine tools, assembly, handling, moving and other production equipment, (j) other home, business, automobile and entertainment products and systems. In addition, other included devices comprise, without exhaustion, (i) web browsers and other communication clients and/or applications (e.g., capable of delivering, transmitting, processing and otherwise supporting electronic program guides, data, email, voice, or other media/ information), (ii) communication servers, servers, routers, switches and other connections and components (e.g., switched, cellular and IP telephony, Internet, Intranets, World Wide Web, LANs, and WANs), (iii) software applications (e.g., note pads, planners, calendars) and (iv) operating systems and components thereof.

A particular environmental device of among other such devices is described as "active" if it is that environmental device to which the user's most recent selection or action pertains. Moreover, the tasking system preferably is enabled to transfer active status among environmental devices based on (a) physical movement relating to the implementation of the tasking system, (b) activity of one or more environmental devices, (c) other inputs, or (d) combinations of these inputs.

General Example of a Tasking System Implementation

The tasking system can be variously implemented. Typically, the tasking system is implemented in software (generally referred to herein as a "tasking software system"). The tasking software system generally operates on/among one or more implementing mechanisms.

Implementing mechanisms can be portable, semi-portable, or of fixed location. Moreover, implementing mechanisms can be variously realized, including, e.g, as a remote control unit, a hand-held computer, a personal computer, a workstation or server computer, some other computing device, or some other communication device.

A. Implementing Mechanisms.

Implementing mechanisms typically comprise various resources that provide for effecting the tasks associated with user selection of objects. The resources generally includes an operating system, collateral software, communication facilities, processing facilities, a memory system, input facilities, and a display screen, in selected combination(s).

The input facilities can be variously implemented. Typically, such facilities are integrated with the screen, e.g., as a touch-sensitive LCD. In addition, however, the input facilities can comprise pointing devices (e.g., such as a mouse or pen), hard buttons, key pads/boards, microphones, fingerprint and retinal scanners, pressure transducers, thermometers, light sensors, particle or chemical detectors, a dedicated global positioning receiver or other transducers, alone or in combinations. Such facilities have utility, for example, if the tasking software system supports one or more (a) a biometric user-recognition and authentication subsystem, (b) a subsystem for acquiring and processing data on ambient environmental states (see discussion of states, below), and/or (c) a mechanism positioning system for acquiring and processing positional data, for determining, e.g., the environment or position in an environment of the implementing mechanism.

The memory system typically comprises one or more of cache memory, dynamic random access memory, mass storage, archival storage and any other hardware, firmware, software, or networking resources associated with storage.

The processing facilities typically comprise one or more processor(s) and/or other logic hardware. A processor can be any digital processing device including, without limitation, microprocessors, microcontrollers, digital signal processors or the like manufactured by Intel Corporation, Motorola Corporation, Texas Instruments, Inc., IBM, AMD, Cyrix, or any other manufacturer of digital processing devices. Other logic hardware includes custom and semi-custom circuitry including ASICs, PLDs, gate arrays or the like, either to operate alone or in combination with a processor.

The communication facilities typically comprise a communication stack and hardware. These facilities preferably are implemented so as to support any and all communication formats, protocols and specifications, whether presently used or not, as well as their equivalents and/or combinations thereof. Supported formats, protocols and specifications include, without limitation, the infrared standards (e.g., IrDA D and C, and AIR), the radio frequency standards (e.g., the proposed Bluetooth and Home RF specifications), and other connectivity standards (e.g., TCP/IP, the proposed HAVI and HAPI specifications, as well as USB, Firewire, and others). The communication facilities can be directed toward wireless or wired operation, whether the implementing mechanism is permanently fixed in a given location, re-locatable or entirely portable.

As an example, responsive to a user selection of an object, the communication facilities process control information corresponding the object's associated task. The facilities package such information into a signal and transmit such signal so that the signal is received by the one or more environmental devices to which the task pertains. In proper receipt of the signal, such environmental device(s) typically changes state or triggers procedures that will lead to a change in state (i.e., to change some feature or aspect of the environmental device). It is to be recognized that the control information can be variously packaged and transmitted. As an example, the control information can comprise the object itself or a representation thereof (e.g., particularly based on a standard wherein objects are universal), or the information can emulate a proprietary signal (e.g., the infrared codes specific to a remote control capability of a particular television), or otherwise. The user selection typically will also implicate the tasking system itself, including by causing changes in active environment, cluster, and/or cluster presentation/formation for display.

The communication facilities preferably support determination of the position of the mechanism. In one example, the communication facilities cooperate with a mechanism positioning system for determining, e.g., the environment or position in an environment of the implementing mechanism. To do so, such facilities and system receive, directly or indirectly, (a) global positioning signals from the global positioning system and/or (b) signal strength data or other telemetry signals from environmental devices. Such position determination, without or without other inputs, preferably is used by the tasking system to anticipate or recognize change in environments. Such position determination, with or without other inputs, preferably is relevant and contributes to the determination of context for the tasking system, responsive to which the tasking system supports clustering operations (e.g., the transition, formulation, reformulation, presentation, and formatting thereof).

Implementing mechanisms, through the communication facilities, are enabled to transmit to and/or receive from environmental devices, including other implementing mechanisms. The transmission/reception preferably is of state and other information (e.g., signals, commands, data and/or instructions). As an example, the information preferably can include control commands, and/or executable software programs or applets, and/or new or modified objects, and/or instructions to modify or construct new objects associated with task(s) relevant to environmental devices. As another example, the information preferably can include signals, such as audio, video, telephony, global positioning, telemetry, and the like. In this latter case, it is preferred that the signals be conveyed digitally; however, it is to be recognized that one or more of the signals can be analog-based, without departing from the principles of the invention.

It is to be recognized that communicated information typically changes the state of the receiving environmental device (or implementing mechanism). As an example, communicated information can represent telephone information that is transmitted to an environmental device for updating telephony related software programs, such as dialers for faxing software. Such information communicated to the device or mechanism preferably is stored in a memory associated with the device/mechanism. As another example, communicated information can include a control command to switch a television to an ON state. As yet another example, communicated information can change the active environment, the active cluster, the active presentation of the active cluster, and the active format of objects of the active cluster.

The operating system ("OS") can be variously implemented. As an example, it can comprise a commercial operating system, e.g., Unix, Linux, Windows NT or otherwise. Moreover, an OS preferably comprises a windowing or paneling system, for providing or supporting user interface functions and operations, including the display of objects. At the same time, it is to be recognized that the OS can be absent, or at least can omit any windowing or paneling system, but instead provide or include a protocol or other basic resources (e.g., coordination among the processing facilities, memory system, input facilities, and screen) to enable such systems. In this latter case, the tasking software system preferably comprises the resources for supporting an appropriate user interface.

However provided, an appropriate user interface preferably is enabled. In that regard, the user interface preferably is a graphical user interface. Moreover, the user interface preferably supports display of objects both persistently and transiently. To explicate, persistent objects generally are displayable on the screen on a persisting basis—until the screen is powered off, or until the persistent object is affirmatively removed or replaced, or for a substantially long period of time relative to a transient object such that persistence is perceived. Transient objects, on the other hand, are displayable on the screen for a relatively short period of time, e.g., a perceived by the user to come and go relatively quickly. In one embodiment, transient objects preferably are displayable in a dedicated screen area. After specified, transient time periods elapse (i.e., a timeout event occurs), the respective transient object clears or fades from the screen (e.g., the transient display being effected using a fading memory buffer, a software control or some other applicable technology). The timeout period can be any of a default period, a user-specified period, a period specified by an implicated environmental mechanism (e.g., responsive to a critical response time), or a period having any other source/purpose. Preferably such periods are subject to update, e.g., based on state tracking or other performance or circumstantial criteria.

The collateral software of the tasking system can be variously comprised, if present at all. Such software, if present, preferably provides functions and operations that are relevant to the tasking system, but otherwise not supported or not fully supported by the system. As an example, the collateral software can provide or enhance (a) user recognition and authentication, (b) acquisition and processing of data on ambient environmental states, and/or (c) acquisition and processing of data respecting the determination of the implementing mechanism position.

B. Tasking Software System.

The tasking software system enables effecting tasks among the system and one or more environmental devices through task-associated user-selectable objects. To do so, the software system can be variously implemented. As an example, the tasking software system comprises:

(a) a state tracking subsystem; (b) a cluster formulation subsystem; (c) a cluster presentation subsystem; (d) a transition subsystem; (e) an object discovery subsystem; (f) a help subsystem and (g) other subsystems. The cluster formulation subsystem formulates and re-formulates the clusters (each duster comprising selected objects), responsive to context and preferably on an adaptive and dynamic basis. The cluster presentation subsystem supports the formatting and presentation of objects of an active, formulated (or reformulated) cluster, also preferably responsive to context and on an adaptive and dynamic basis. The transition subsystem supports transitions among clusters as to active status, or among formats/presentation of an active cluster. The state tracking subsystem supports context determination by gathering data respecting one or more of environmental, device, system and other states. The object discovery subsystem supports the discovery of environmental devices which are available and/or not available. The help subsystem supports user interaction with the tasking system.

The tasking software system and, in turn, each of the respective subsystems thereof, generally operates in conjunction with the implementing mechanism and its resources. As an example, the cluster presentation subsystem typically cooperates with the operating system, particularly the user interface thereof, and screen of the implementing mechanism in presenting clusters of objects. As another example, if the tasking software system comprises a user recognition subsystem, such subsystem typically cooperates with resources including, as examples, one or more of (a) the memory system, wherein user data is stored, such as registration data (e.g., names, birth dates, passwords, and the like), biometric data (e.g., voice or finger print(s), grip pressure, hand temperature, etc.) and/or use signatures (e.g. usage habits that distinguish each user), (b) input facilities (e.g., microphone, fingerprint scanner, pressure transducer, and thermometer) and (c) any collateral software (e.g., for enhancing or extending the functions/operations). As yet another example, if the tasking software system comprises a mechanism positioning subsystem, such positioning subsystem typically cooperates with resources including (a) the communication facilities (e.g., so as to receive telemetry data from environmental devices or global positioning signals), (b) input and processing facilities in order to acquire and process information, including signal strengths (e.g., to determine environment or position in an environment based thereon, typically in triangulation) or GPS data, and (c) any collateral software (e.g., for enhancing or extending the functions/operations). (It is to be recognized, as previously described, that both/either user recognition and/or positioning can be implemented entirely by collateral software, particularly in conjunction with implementing system resources.)

A state tracking subsystem is provided in order for the tasking software system to enable the tasking system to support clustering operations of task-associated objects responsive to context. Such state tracking subsystem, in conjunction with the implementing mechanism, the tracking of selected states. Tracked states typically include, as examples, one or more of environment states, device states, and system states. Tracked states typically also include states respecting other relevant criteria, such as temporal criteria. Examples of state tracking include the following;

1. Environment State Tracking. A tasking system of the present invention preferably supports the tracking of the state of each environment based on selected criteria. Typical criteria comprise the types and numbers of devices available, as well as selected physical or logical conditions. Such latter criteria typically include, as examples, one or more of time, date, temperature and other climactic data, noise amplitudes and frequencies, ambient light conditions, ambient air quality (e.g., by carbon monoxide/dioxide parts and/or smoke particulate counts), other ambient conditions, available network bandwidth, network transmission latency, and power availability.

2. Device State Tracking. A tasking system of the present invention preferably supports the tracking of the state of each environmental device. Such tracking is by selected criteria. Typical criteria include, for example, (a) the current state of each device, including which device is active, (b) relationships among devices, (c) relationships among states, functions and operations of a device or across devices, (d) historical relationships and trends.

The extent of such tracking, if any, typically corresponds to the class of the environmental device. The device classes include, as examples: (1) write-only environmental devices that do not communicate state information to the implementing mechanism (e.g. a light switch); (2) read/write environmental devices that communicate state information to the implementing mechanism (e.g., audiovisual devices); (3) read-only environmental devices that transmit state information to the implementing mechanism; and (4) intelligent environmental devices that are enabled to communicate information (e.g., signals, commands, data and/or instructions, such as applets or programs) to and from the implementing mechanism, such communication typically including state information. Intelligent environmental devices typically incorporate a processor and are able to function/operate based on executing software code; such devices include, as examples, a computing device or system (e.g., a personal digital assistant), an Internet site, certain automobiles and domestic appliances, and certain communicating devices.

3. System State Tracking. A tasking system of the present invention preferably supports the tracking of the state of the system itself, environment-by-environment. Such tracking again is by selected criteria. Typical criteria include, as examples, one or more of (a) the user(s), (b) users' configuring preferences and sets of preferences (original and as updated by user or system), (c) the objects and sets of objects that each user selects and/or declines to select, (d) the frequency of selection of particular objects and sets of objects, (e) relations between system states and other tracked states (e.g., environment states and/or device states), (f) current user, current user selection, active cluster, active presentation and active formats, and (g) metrics associated with user interface states and object selection.

The current user, current user selection, active cluster, active presentation and active formats may be tracked for various purposes. One purpose is to support persistence, particularly with use cycling, battery replacement (assuming portable operation supported by battery-sourced power) and power failure. As to the latter two cases, the above current and active criteria are tracked in order to overcome mundane problems. The first case, however, reflects one solution to the issue, in implementation, as to what and how objects will be provided, e.g., when the mechanism is first used after a suspension or termination of use. More specifically, this case reflects that the tasking system may be returned to the state prevailing as of its last use. (At the same time, other solutions are available, including using biometric or other recognition functions to provide objects that, based on the time/date and usage patterns, likely are appropriate.)

User configured preferences preferably are supported. However, support can be variously implemented. As an example, a user can be enabled to input preferences as to cluster formulation, cluster presentation, cluster formatting, and otherwise. In one example case, the user is enabled to define individual or plural objects (individually or together, a "macro object"), which macro object engenders a set of tasks, whereby, based on user selection of the macro object, one or more environmental devices are tasked in sequence, in parallel, as available, or in combination (such task set is sometimes referred to, in this specification, as a "macro"). Macros typically are associated with a single macro object so that selecting that object works to select all of the macro's tasks. As an example, a macro can be established that provides a macro object that, if selected, dims the lights in a room to a preferred setting, switches the TV state to ON, and adjusts the TV to a particular station at a particular volume, such tasks can be in sequence (e.g. TV state and station tasks) or in parallel/as resources are available (e.g., lights and TV substantially at the same time or in either of the two orders, or otherwise). (Note: the tasking system preferably is implemented so that one or more of a macro's tasks may be suspended or terminated, from instance to instance, based on conflicting information from the environment; e.g., the lights of the above example may not be dimmed if and while the implementing mechanism detects that a light-required meal is being served/consumed.)

Approaches for enabling such user configuration are various. Examples include: (a) a first program mode wherein the user exercises the user interface, repeatedly working through the interface's menus, submenus, icons and the like so as to reach, select and configure preferences (e.g., add an object to a macro object; e.g., disable one of more of an environmental device's tasks via the objects associated therewith), (b) a second program mode wherein each implicated device is displayed at a root window, whereby selecting any one such device results in displaying each object/task relevant to the device so that repeated selections among objects and devices, in some appropriate order, enables the user to configure preferences, (c) a third program mode wherein user selections are reviewed and optimized (e.g., ordered) based on protocols, algorithms or other circumstances that may be applicable (see discussion below respecting a help subsystem), and (d) combinations of the above.

The tasking system preferably is enabled to development a user configuration—and/or to update user configured preferences. Such system operation typically is based on usage history, e.g., by tracking user selections. The update capability preferably is applicable to macro objects, whether such macro objects are user defined or system developed. In the former case, it is preferred that the tasking system enable the user to lock so-defined macro objects from update by the system itself.

The tasking system preferably is also enabled to track the objects and sets of objects that each user selects and/or declines to select, and the frequency of selection of particular objects and sets of objects. Such tracking tends to indicate relationships Off among objects, states, and sets of same. Any such relationships, so indicated or otherwise available, are also tracked. Such relationships typically having utility in system generated macro objects, as well as other clustering operations, such as any of the formulation, presentation and formatting of clusters. As an example, if subsequent to or whenever one object is selected, a second object is determined to be always or, at least, frequently selected, that circumstance preferably is tracked and, responsive thereto, the second object can be (a) automatically selected or (b) displayed transiently on the screen, in the event the first object is selected.

The tasking system preferably is also enabled to track metrics, particularly metrics for assessing the efficacy of the tasking system. In use, the user typically exercises the presentation of clusters via a user interface. That exercise typically is icon by icon, layer-by-layer, and directed to the user reaching and selecting one or more desired task-associated objects. That exercise correlates to numbers of actions/steps on the user's part, such number tending to vary by selected object, based on the various cluster presentations from which the user may initiate the exercise. In one embodiment, the tasking system may be implemented so that steps involved in tasking an environmental device follow a predefined path or a directed cyclic graph format, so as to preclude or control direct jumping between graph nodes or limit the amount of drill-down and drill-up operations a user must endure. In other embodiments, the number of steps, at least as to some objects/tasks, preferably is minimized through metric tracking. As an example of the latter embodiment, for an object A, it may be determined that the number of steps is to be minimized based on exercises starting from cluster presentations I, II and III, while it is a "don't care" presentation IV and it is fixed from presentation V. In this example, metrics tracking preferably enables clustering operations to accomplish the minimization, while also preserving the same or similar goals as to other objects. An additional, example metric comprises minimizing the time associated with reaching and selecting a desired object against the time associated with enjoying the implicated environmental device(s) (or the environment as a whole) between such selection and the initiation of the next search for an object relating to such device(s) (or the environment as a whole).

4. Temporal State Tracking. A tasking system of the present invention preferably supports the tracking of temporal states. To do so, the tasking system typically sets up and maintains timers, including in association with user selections. The timers track elapsed time, including among (a) one or more user selections of objects, (b) one or more tasking system functions/operations, and/or (c) one or more environmental device functions/operations. Doing so enables the tasking system in various endeavors, including, as examples, (i) maintaining context, (ii) characterizing user selections and relationships thereamong, and (iii) determining the performance of the tasking system and/or the tasking related thereto (e.g., either of environmental device(s) or the tasking system itself).

The characterization of user selection preferably is supported, at least in connection with user selections requiring related, subsequent or otherwise additional user action. If a user selects such an object with which additional action is required, the absence of that required action within some elapsed time may be interpreted so as to characterize the initial selection as forgotten or as an error. In turn, if the initial selection is so characterized, the tasking system preferably either (a) notifies the user of the circumstance, (b) automatically cancels that selection, or (c) both (e.g., in some sequence, typically using another timer). The automatic cancellation substitutes for manual cancellation by the user, thereby saving the user interaction effort. It also engenders safety in that, for example, it may be directed to gracefully shut down unintentionally initiated/remaining (or inadvertently aborted) tasks, thereby working to return implicated environmental device(s) to previous state(s) or to some safe, stable or stand-by state.

The tasking software system preferably also supports, in conjunction with the implementing mechanism, a duster formulation subsystem. A duster formulation subsystem enables the system to formulate and reformulate clusters. To do so, the subsystem employs various approaches, including, for example, by employing (a) relationships developed through empirical studies or through theoretical analysis, (b) genetic algorithms, artificial intelligence or other production solutions, (c) by user-specified configuration (e.g., preferences), (d) combinations of these and other approaches. The relationship approach is particularly useful as to environments wherein environmental devices not only can be anticipated, but also have well understood functions and operations, such functions/relationships mapping to objects. These mapped objects can be provided as built-in cluster(s) at sale/distribution of the tasking system. Moreover, the number, depth and quality of relationships among such functions/operations applicable to devices and various environments is amenable to optimization with the tasking system's acceptance in the marketplace. Responsive to this optimization, the built-in clusters can be reformulated for distribution to the tasking systems. To do so, as an example, a clustering operation center is contemplated which (i) via Internet downloads or other communications, is capable of receiving and analyzing clusters (including presentations and formattings) developed and used by large pluralities of tasking systems, so as to reformulate optimized clusters, and (ii) via Internet uploads or other communications, is capable of distributing such reformulated clusters.

Toward further explication, the cluster formulation subsystem preferably formulates clusters based on contextual gravity among/within a universe of objects. Such gravity typically has temporal (e.g., historic, current, trending and transitory) aspects and is characterized by relative significance and attraction between and among certain objects according to, as examples, (i) the tasks with which the objects are associated, (ii) any sequence of environments, (iii) the available environmental devices or the devices that may become available by anticipatable environmental changes, (iv) the states of devices, (v) the user and the user's specified preferences, and (vi) the user's past behavior in the environment and anticipatable environments, e.g., respecting implicated devices and the selection of associated tasks.

In a basic illustration, it is assumed that a particular environment comprises a number of environmental devices. Such environmental devices are characterized, in aggregate, by a relatively large number of functions and operations that may possibly be selected by the user. Of these possible functions and operations, some relatively smaller number of functions and operations are characterized, respecting selection, as probable. Of these probable functions and operations, some reasonably small number of functions and operations are characterized, respecting selection, as useful. If the number of useful functions and operations is sufficiently small, they can generally be formulated as one cluster of objects. Plural clusters preferably are formulated if the number of useful functions and operations is insufficiently small, as well as for other reasons (e.g., convenience). It is to be recognized that clusters can be formulated which overlap as to one or more useful functions and operations. It is also to be recognized that clusters can be formulated that comprise (i) one or more possible functions/operations, (ii) one or more probable functions/operations, and (iii) combinations of useful, probable and possible functions/operations.

Moreover, the cluster formulation subsystem preferably reformulates clusters based on contextual gravity among/within a universe of objects. Reformulation occurs under various circumstances, including, in particular due to changes in contextual matters. In the above example, for instance, any particular cluster among the plural clusters could be reformulated based on a function/operation of a device shifting from useful to non-useful, or the reverse. As another example, a change in the devices available in the environment adds or subtracts functions and operations and, thus may add/subtract objects from one or more clusters. Moreover, an object may be added to a cluster if the object corresponds to a function/operation that is found to have a close relationship to functions/operations associated with other objects inside the cluster. Similarly, an object may be removed from a cluster if such a relationship expires.

The tasking software system preferably also supports, in conjunction with the implementing mechanism, a cluster presentation subsystem. The duster presentation subsystem supports the functions of formatting and presenting objects of a cluster. The cluster presentation subsystem preferably operates responsive to context, on an adaptive and dynamic basis. It is recognized that the formatting and presenting functions may be omitted from the tasking software system, under certain circumstances, without departing from the principles of the invention. At the same time, it is recognized that formatting and presenting a cluster's objects typically has greatest importance as the cluster's number of objects grows beyond what can be displayed effectively on the screen of the implementing mechanism.

The formatting function provides for organizing objects by and among various types of objects. As an example, objects of an active environment (or cluster) are subject to formatting by/among object types that include: (a) a tasking object which, if selected, effects a particular task for a particular environmental device; (b) a macro object which, if selected, effects a predefined set of tasks; (c) an activation object which groups, by respective objects, one or more of environmental devices, presentations, or other elements subject to being activated so that, if the activation object is selected, the object displays, for selection, the respective objects of implicated devices, presentations, other activation objects or the like; (d) a common object which, if selected, provides a particular task (e.g. a numeric key pad) that may be associated with any number of environmental devices; (e) a closed navigation object which groups, for selection under the one object, a relatively limited number of tasking objects, macro objects, activation objects, common objects, and/or other closed navigation objects; and (f) an open navigation object which groups, for selection under the one object, a relatively large number, if not all, of the active environment's tasking objects (or the tasking objects of the environment's highest priority, or most relevant, or active cluster), as well as any or all macro objects, activation objects, common objects, and/or closed navigation objects. As to objects of non-active environments (or clusters), the formatting function provides for organization thereof by and among various object types; these object types include, as examples, (a) an environment activation object which groups, by respective objects, the environments (clusters) subject to being activated so that, if the object is selected, the active object displays, for selection, the objects of the respective environments (clusters); and (b) a search object which provides access (e.g., via a list or icons) to and of all possible tasks for all environment devices and, preferably, for selected/all supported environments. As to meta-objects, the formatting function provides for organization thereof by and among various object types; these object types include, as examples, (a) a help object which provides access to the help subsystem, (b) navigation objects for moving among selections, formats, and/or presentations (e.g., a forward and/or back icon), and (c) a menu object, which provides access to and of configurations or options applicable to the tasking system, its implementing mechanism, and/or its tasking software system (e.g., a soft button which enables the user to display the presentation on a TV). It is to be recognized that any particular object may be formatted by and among greater than one object type.

The presentation function provides for displaying objects, typically by formatted object types. In so displaying objects, the presentation function typically selectively presents objects/object types. In that selective presentation, the presentation function preferably is responsive to context, so as to display objects/object types which are likely to have greatest utility and, among other things, thereby to enable the user to quickly, easily, pleasurably, efficiently and otherwise optimally select desired and appropriate objects/object types so as to provide for minimal, reduced or optimally reduced user interaction with the tasking system vis a vis effecting tasks among the tasking system and environmental devices. Moreover, the presentation function supports various features, including, as examples, relative disposition, sequencing, ordering, layering, menuing, organizing, and transiency/persistence. To do so, the presentation function operates either in conjunction with an OS's user interface capabilities or, particularly in the absence of such capabilities, alone. In the latter case, the presentation function preferably comprises resources for supporting an appropriate user interface running on the implementing mechanism.

Continuing the basic illustration, the environmental devices include, perhaps among others, a TV and VCR. Accordingly, one cluster of useful tasks likely includes the tasks of switching both devices ON, adjusting the channel(s) of the TV and the VCR (e.g., the VCR tuner providing for picture in picture), enabling/disabling picture in picture (PIP), setting the volume, and switching both devices OFF. Based on context, it is determined that both devices tend, in use, to be switched ON (or OFF) at once. Moreover, adjusting the channels is via numeric key pad entries. As such, the formatting function may provide: an ON/OFF macro object to provide TV/VCR switching; respective activation objects for the TV and VCR; a common object to provide a numeric keypad for channel adjustment; respective tasking objects for volume control and PIP; and one or more closed navigation objects that include, among other object types and/or in combination, the PIP tasking object, the TV and VCR activation objects and the ON/OFF macro object. In operation, upon the user's retrieval of the implementing mechanism the presentation function preferably displays the presentation that was active when the mechanism was last used (e.g., by reference to system state tracking of the tracking subsystem). Accordingly, at the instant of retrieval, the TV and VCR are both in an OFF state. Thus, the presentation function, in this example, may display only the ON/OFF macro object, in that no other task is then relevant. Once the ON/OFF macro object is selected, however, the presentation function, in this example, may display the above described volume control and PIP tasking objects, TV and VCR activation objects, the numeric keypad common object and a closed navigation object. In this presentation, the PIP tasking object may be displayed transiently and, for likely lack of relevance, the ON/OFF macro object may be omitted (although it may be included in the closed navigation object). Once the user completes selections, if any, of channels, PIP and volume, the presentation function may display the ON/OFF macro object, the volume control tasking object, TV and VCR activation objects, the numeric keypad common object and a closed navigation object. In this presentation, the closed object may include the PIP tasking object, while omitting the ON/OFF macro object.

Other examples of the presentation function include: (a) in using an automatic teller machine ("ATM") of an active environment, the presentation system selectively displays object types that respond to that context; as such, the user is enabled to select an object(s) that makes the ATM the active device; doing so also triggers the implementing mechanism to communicate with the ATM some predetermined "hand shake" coding, including, for example, the user's account number and/or password; with successful conclusion of the handshake, the presentation mechanism displays objects/object types that highlight the user's anticipated selection at the particular ATM (e.g., the state tracking subsystem indicates that the user predominantly limits activity at this ATM to $100 withdrawals); at the same time, the ATM may have a similar display (e.g., based on participating in a distributed implementation of the tasking system, or otherwise) or some standard display which offers other selections; before, during or after completing a transaction, the PDA preferably invokes (e.g., in the background) the user's finance software application to assist in accounting for the selected transaction, such software comprising another environmental device and (b) on Sundays, at one in the afternoon, for an environment that includes a TV, the retrieval of the implementing mechanism and the switching on the TV triggers the presentation system to automatically select the broadcast channel showing NFL football, while also automatically setting the volume, and establishing a presentation of objects and object types responsive to the anticipated context identified via the state tracking subsystem (and notwithstanding the nature of the previous active presentation).

The tasking software system preferably also supports, in conjunction with the implementing mechanism, a transition subsystem. The transition subsystem supports transitions among clusters as to active status, or among formats/presentation of an active no cluster. The transition subsystem is variously triggered, including, as examples: (a) by the rendering of a new environment as the active environment, (b) by ambient variation within the active environment (e.g., responsive to darkness, the transition subsystem triggers the presentation subsystem to prominently display one or more tasking objects for lighting adjustment), (c) by the rendering of a new environmental device as the active environmental device, (d) by input from the active environmental device, (e) by change in active user, (f) by user selection of an object/object type (as indicated in the above continued, basic illustration), and (g) by combinations of these inputs. In the event of being triggered and to effect a transition, the transition subsystem coordinates with one or more subsystems, including, as an example, with the cluster presentation subsystem.

The tasking software system preferably also supports, in conjunction with the implementing mechanism, a discovery subsystem. The discovery subsystem provides a discovery function, such function enabling the system to (a) discover the availability of, and establish communication capability with, environmental devices and/or (b) discover the unavailability of, and suspend/terminate communication capability with, environmental devices. The discovery function can be variously implemented, including by providing for roaming, scanning, polling, interrupt handling or otherwise (to do so with legacy devices, additional hardware/software is anticipated, such as a communication device that—associated with a specified device—controls/monitors the associated device's power consumption, such that, a device can be discovered based thereon). Moreover, such discovery function can be variously invoked, including, as examples, continuously, substantially continuously, by/on regular intervals and/or responsive to selected events. The discovery function returns a determination of availability (or lack thereof) of environmental devices. As such, the discovery function generally relies on the environmental devices being compatible with the tasking system, so as to support their discovery.

In the event that an environmental device becomes "not discovered" as to an active environment, the tasking software system typically provides for disabling or otherwise rendering irrelevant any objects associated with such device. So disabled or rendered irrelevant, the objects generally are not displayed, or even displayable, so that the objects neither confront the user nor consume the screen's limited dimensions. (The tasking software system may accomplish this result in various ways, including, as examples, by reformulating clusters, by enabling a cluster to be active only if the suspended/terminated objects are not present therein, and/or by invoking the formatting and/or presentation functions of the presentation subsystem.)

To continue the basic illustration, the environmental devices include, perhaps among others, a TV and VCR, but the VCR is sent out for repair. In such case, it is contemplated that, when the discovery function is invoked (regardless of the trigger), the VCR will be discovered as unavailable. In such case, the tasking system typically (i) disables/terminates the VCR-specific objects/object types, (ii) as necessary, reformulates clusters, (iii) as necessary, organizes or re-organizes objects by or among object types, and/or (iv) activates a new cluster, format or presentation. However, the VCR objects typically will remain disabled/terminated only until the tasking system re-discovers the VCR, such as via reception of an introductory message from the VCR, or user interaction to effect that result.

The discovery subsystem may also support an introduction function, such function enabling the system to communicate "get-to-know-me" information to/from environmental devices. The introduction function, if supported, preferably administers the communication of such information. Moreover, that information preferably includes, as an example, the functional states/state transition diagrams, and/or other matter, for the purpose, among other things, of enabling support of tasking among the tasking system and the environmental device.

The tasking software system preferably also supports, in conjunction with the implementing mechanism, a help subsystem. A help subsystem supports user interaction with the tasking system. As examples, the help subsystem supports user interaction respecting the user's configuring preferences, analyzing such configurations against existing clusters and prescribed clustering approaches, identifying conflicts and other problems based on such analysis and otherwise providing feedback/feed-forward in proper and/or efficient employ of the tasking system. As another example, the help subsystem supports user interaction respecting macro creation, revisions, deletion, etc.

The tasking software system preferably also supports other subsystems. These other subsystems can be variously provided. Examples include the above described user-recognition subsystem and mechanism positioning subsystem. An additional example subsystem would provide for acquisition and processing of data on ambient environmental states (e.g., temperature, pressure, light intensity, air-borne chemical/particulate concentrations, and the like). It is to be recognized, as previously described, that any/all of these subsystems can be implemented entirely or partly (e.g., to enhance or extend the subsystem's capabilities) using collateral software, particularly in conjunction with implementing system resources.

C. Various Example Aspects, Features and Examples.

A tasking software system can be implemented as an integrated software object or a collection of discrete software objects in an object oriented software program, or as a single integrated software program, or otherwise. In that regard, a tasking software system can be implemented in/at one physical location or unit, as well as among a plurality of physical locations/units in or associated with the environment.

The employ of a tasking software system enables the tasking system to be integrated with an environmental device. Indeed, if the tasking software system operates on/among one or more computing devices, the tasking system can be integrated with one or more environmental devices. To illustrate, the tasking system's computing device could be a personal digital assistant ("PDA") on which runs a tasking software system. In such case, environmental devices could include, as examples, the operating system, selected application programs, the communication stack and peripheral devices, as well as external devices, such as a TV, a VCR, and the like.

Tasking systems, in one embodiment, are implemented through implementing mechanisms having hand-held form factors and commensurately compact screen dimensions. Such implementing mechanisms include, in addition to PDAs, remote control devices (sometimes referred to herein as "remotes"). In the case of remote control devices, the tasking system's tasks, typically, are effected by transmitting control commands to the environmental devices. In other cases, the tasking system's tasks typically may entail functions and operations relevant to either or both the system itself or environmental devices and, as such, may be effected by communicating commands and other task-related information among the tasking system and any applicable environmental devices.

Tasking systems, in other embodiments, may be implemented using implementing mechanisms having other than hand-held form factors. Even so, the implementing mechanisms' screen dimensions typically are finite, such that display of objects can become problematic, e.g., due to object number, object arrangement, ambiguity of association to environmental devices, uncertainty as to device availability and any sequential operating constraints, and otherwise.

A tasking system, according to the invention, may be implemented by employing other than through a single implementing mechanism. As an example a tasking system may be implemented by distribution of functions and operations over, between or among any combination of a first implementing mechanism, additional implementing mechanisms, one or more other external computing devices, other computer system(s) and/or network resources, without departing from the principles of the invention. As another example, a tasking system may be implemented to support distribution of its functions/operations to/among environmental devices, particularly intelligent environmental devices.

To illustrate, a tasking system can be configured to distribute to one or more environmental devices the tasking system's operations, including clustering operations. To do so, the tasking system forwards selected tracked state data from an implementing mechanism to environmental device (s). In one case, the environmental device (i) analyzes the communicated data, (ii) confirms, modifies, creates or deletes one or more clusterings, and (iii) transmits such results to the implementing mechanism so as to update (e.g., by overwrite) the clusterings of the tasking system. As a specific example, macro-related tasks may be distributed to one or more environmental devices for construction, editing and testing before any macro object is implemented in connection with the tasking system.

Generally, the tasking system effects tasks that are relevant to one or more environmental devices. It is to be recognized, however, that the tasking system can be implemented so as to support being itself tasked, i.e., tasked by one or more environmental devices. In such case, it is preferred that such tasking be appropriately controlled, such as by limiting tasks to those that are known to be acceptable or that are subject to acceptance by the user on some temporal bases (e.g., each time, or from time to time).

In enabling such tasking of the tasking system, mutual tasking is contemplated, including by communication of information extending to signals. In that regard, mutual tasking enables the tasking system, particularly the implementing mechanism, to emulate environmental devices. As an example, in an environment that includes a telephony device, a tasking system implemented using a PDA having a microphone and speaker can emulate a portable phone, complete with tasks (e.g., caller ID, dialing, routing to an answering machine, screening and otherwise) that are accessed by the user via objects/objects types that are displayed on the PDA screen. In addition, if the PDA has an Internet client (e.g., a browser) and assuming the user has an appropriate account, the tasking system thus enables access to the Internet, World Wide Web and/or other networks.

Figures

Referring now to FIG. 1, an embodiment is illustrated of an implementing mechanism 100, according to the present invention. The implementing mechanism 100 comprises various resources for effecting tasks among the tasking system and environmental devices, based on object selection (s). The resources preferably include: (a) processing facilities 102; (b) memory system 104 (sometimes referred to herein as "memory"), the memory system 104 including one or more of cache memory, dynamic random access memory, mass storage, archival storage and otherwise and being coupled with processing facilities 102 so that processing facilities 102 may read from or write to memory 104; (c) input facilities 106, each coupled with processing facilities 102, through which users enter selections, e.g., of objects/ object types associated with task(s); (d) a screen 108 coupled with processing facilities 102 for displaying objects/ object types and, otherwise, a user interface; (e) communication facilities 110, the facilities being coupled with processing facilities 102, for effecting communication (transmitting, or receiving, or both) with one or more environmental devices; (e) an operating system (e.g., Unix, Linux, Windows NT or otherwise) 112, coupled with processing facilities 102 to run thereon (in conjunction with, and preferably resident in, memory 104), said software including software (e.g., conventional application software); (f) collateral software 114, coupled with processing facilities 102 to run thereon (in conjunction with, and preferably resident in, memory 104), said software providing or enhancing/extending functions relating to the below-described tasking software system, such as functions for one or more of recognizing the user, locating the implementation mechanism's position, and acquiring/processing ambient environmental states (e.g., temperature, pressure, light intensity, air-borne chemical/particulate concentrations, and the like); and (g) tasking software system 116, coupled with processing facilities 102 to run thereon (in conjunction with, and preferably resident in, memory 104), the tasking software system providing, without exhaustion, for tracking of states, for dynamically and adaptively performing clustering operations responsive to context, and for otherwise effecting the tasking system according to the invention.

The implementing mechanism 100 may also comprise various other resources. Such other resources, as an example, include one or more additional output facilities 118 coupled with processing facilities 102, such as an audio speaker or a printer. Moreover, the implementing mechanism 100 can also work cooperatively with other implementing mechanisms and/or computing devices or systems (i.e., such mechanisms, devices and systems interacting with the mechanism 100 other than as environmental devices). Such cooperative work is not illustrated.

Input facilities 106 may be combined with screen 108 in such a way that user selections can be activated by touching the screen 108 (e.g., a touch-sensitive LCD). Alternatively or additionally, input facilities 106 can comprise, without limitation, a pointing device (e.g., such as a mouse or pen), hard buttons, a microphone, a key pad or the like, or combinations thereof. As shown in FIG. 1, input facilities 106 are coupled with processing facilities 102 so that input, particularly user selections of objects/object types, can be received and processed by processing facilities 102, typically in conjunction with other resources. The processing may involve various functions/operations, including activating or modifying the configuration of other resources in response thereto (e.g., modifying the presentation of objects/ object types displayed on screen 108, turning on or off the additional output facilities 118, communicating information via the communication facilities 110, or storing information to memory 104).

Figure 2:
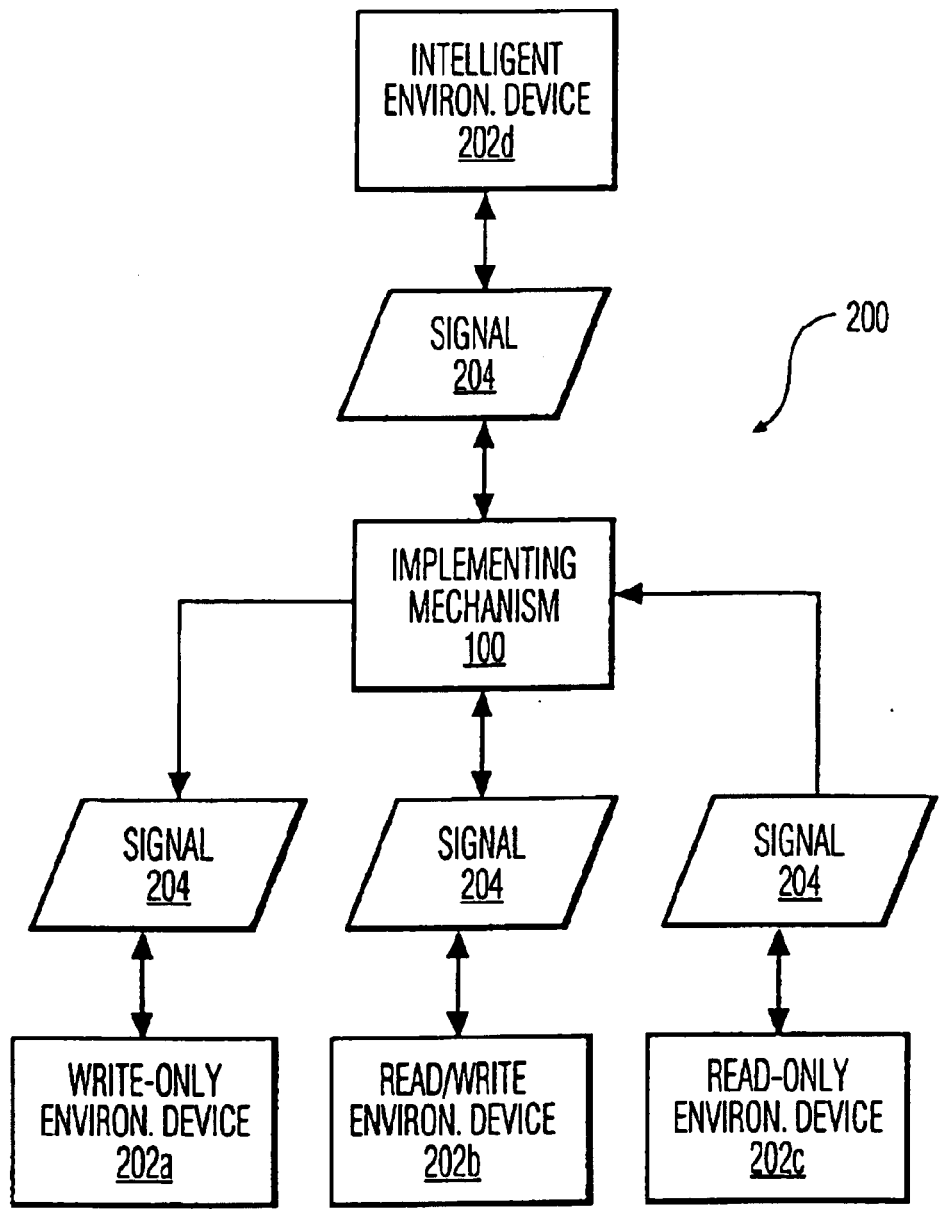
FIG. 2 illustrates examples of input and output flow among an implementing mechanism and environmental devices.

Referring now to FIG. 2, a layout 200 illustrates communication among the implementing mechanism 100 and environmental devices 202, through communication facilities 110. Generally, the communication from the implementing mechanism 100 involves packaging information in/as a signal 204 and transmitting the information as signal 204 to an environmental device 202. However, as certain classes of environmental devices are contemplated that can also transmit information, the communication facilities 110 typically are implemented so as to be capable of receiving such information, e.g., as a signal 204 transmitted from an environmental device. The information communicated among the implementing mechanism 100 and environmental devices 202 can comprise one or more of signals, commands, data and/or instructions, such as audio/video/ telephony signals, applets or other executable programs, control commands, status data, combinations thereof, or otherwise.

Classes of environmental devices include, as examples: (1) write-only environmental devices 202a that do not communicate state information to the implementing mechanism 100; A; (2) read/write environmental devices 202b that communicate state information to the implementing mechanism 100; (3) read-only environmental devices 202c that transmit state information to the implementing mechanism 100; and (4) intelligent environmental devices 202 that are enabled to communicate information (e.g., signals, commands, data and/or instructions) to and from the implementing mechanism 100, such communication including state information.

Figure 3:
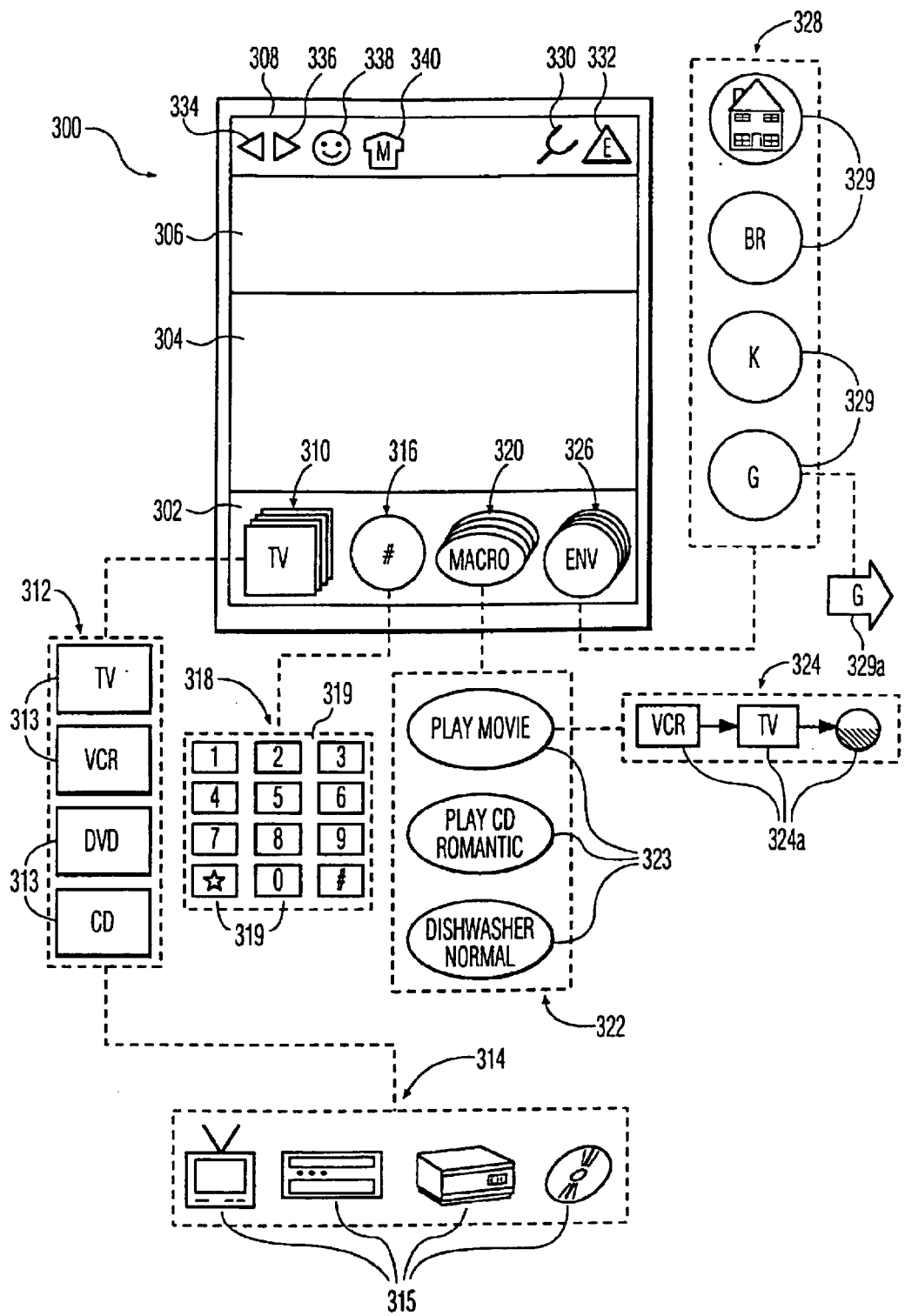
FIG. 3 diagrams example objects and object types.

Referring now to FIG. 3, a screen 300 of an implementing mechanism 100 is shown. The screen 300 displays an example user interface. The user interface is supported, as previously set forth in the specification, by an operating system and/or a cluster presentation subsystem of a tasking software system.

The user interface, as shown, is configured segmented as various areas. The areas include a lower area 302, a lower middle area 304, an upper middle area 306 and an upper area 308. Although segmentation is shown, it is to be recognized that the user interface can be otherwise configured, without departing from the principles of the invention.

The areas 302–308 contain various example object types. The lower area 302 is shown to include an activation object 310 which, if selected, displays a textual group 312 of tasking objects 313 (or an iconic group 314 of tasking objects 315). Here, each of the grouped tasking objects 313/315 correspond to a respective environmental device, including a TV, a VCR, a DVD, and a CD. Each of these tasking objects 313/315, if selected, effects the activation of the corresponding device. As shown, the active environmental device is the TV, as indicated by legend of activation object 310.

The lower area 302 also is shown to include a common object 316. The common object 316, if selected, effects a particular task that may be associated with any number of environmental devices. As shown, the common object 316 is associated with a numeric key pad function, such that, if the common object is selected, a virtual key pad 318 is displayed which comprises various tasking objects 319. If these tasking objects 319 are selected in appropriate combination, a task is effected with respect to the active environmental device. Here, the active environmental device is the TV and, accordingly, entering numbers via the tasking objects 319 implicates selecting a TV channel.

In addition, the lower area 302 is shown to include a closed navigation object 320 which, if selected, displays a textual (or iconic) group 322 of macro objects 323. Here, each of the grouped macro objects 323 correspond to a respective macro, including, as legended, the PLAY MOVIE, PLAY CD ROMANTIC, and DISHWASHER NORMAL macros. Each of these macro objects 323, if selected, effects the activation of the corresponding macro. Moreover, as shown for the PLAY MOVIE macro, the cluster presentation subsystem can be configured to display a macro view 324, the view describing the selected macro's set of tasks. In one embodiment, the view 324 comprises merely icons/text. Here, the PLAY MOVIE macro object is selected and icons are displayed indicating that the tasks include, in sequence, VCR activation, TV activation and dimming of lights. It is to be recognized that, in other embodiments, the cluster presentation subsystem can be configured to display a macro view 324 wherein the selected macro's set of tasks are set forth as tasking objects 324a. In such case, each of the VCR, TV and light tasking objects 324a could, if selected, effect a user-assigned task (or tasks if set up as macro objects).

The lower area 302 is also shown to include an environment activation object 326. The environment activation group, if selected, displays an iconic/textual group 328 of tasking objects 329, each tasking objects 329 corresponding to a respective, supported environment. Here, the supported environments include a home (e.g., the house icon), a bedroom (e.g., BR), a kitchen (e.g., K) and a garage (e.g., G). Each of these tasking objects 329, if selected, effects the activation of the corresponding environment.

In an example embodiment, selection of an environment tasking object 329 when the user is not physically present in the selected environment preferably engenders display of an open navigation object 329a for such environment. The open navigation object 329a preferably includes an appropriate legend indicating the selected environment. Moreover, the open navigation object 329a, if selected, enables display of a relatively large number, if not all, of the selected environment's tasking objects (or the tasking objects of the environment's highest priority, or most relevant, cluster), as well as any or all associated macro objects, activation objects, common objects, and/or closed navigation objects. Such display preferably is enabled by scrolling, alphabetic lookup, or otherwise, i.e., not to consume all/most of areas 302–308.

As shown, the environmental activation object 326 omits to identify the active environment. However, such identification can be supported without deviating from the principles of the invention.

The upper area 308 is shown to include example object types including a help object 330 and a closed navigation object 332. The help object 330 provides tools relevant to the tasking system, e.g., for accessing/using the macro features. The dosed navigation object 332, if selected, displays a textual (or iconic) group of tasking objects (not shown), each such object corresponding to a respective telephone number for emergency response units, such telephone number being automatically dialed (including play of an associated, taped outgoing message). The emergency response units typically comprise "911" response, the fire department, EMS, Doctor (s), family members and the like.

The upper area 308 is shown to include other example object types including navigation objects 334 and 336, and activation object 338. The navigation objects 334 and 336 provide, respectively for transitioning, at user selection, back and forward through presentation(s) of objects. As such, the navigation objects, if selected, provide inputs to the transition subsystem. The activation object 338, if selected, displays a textual/conic group of tasking objects (not shown) corresponding to respective user(s). In turn, each of these tasking objects, if selected, effects the activation of the clusters, presentations and formats relating to that active user.

As shown, the activation object 338 omits to identify the active user. However, such identification can be supported without deviating from the principles of the invention.

The upper area 308 is also shown to include a menu object 340. The menu object 340, if selected, effects the display of the user interface and object types on a selected second screen, e.g. a TV screen. Such second screen typically is larger and brighter than screen 300.

The tasking system, once the menu object is selected, preferably supports display of a cursor on the second screen, such cursor being controlled by keys, a pointing device, or otherwise whether hard or soft—provided by the implementing mechanism.

As shown in FIG. 3, various object types tend to have distinctive shapes. It is contemplated that, together with appropriate legends (textual, iconic or otherwise) and/or color, each of object types and their respective application can be distinguished.

Figure 4:
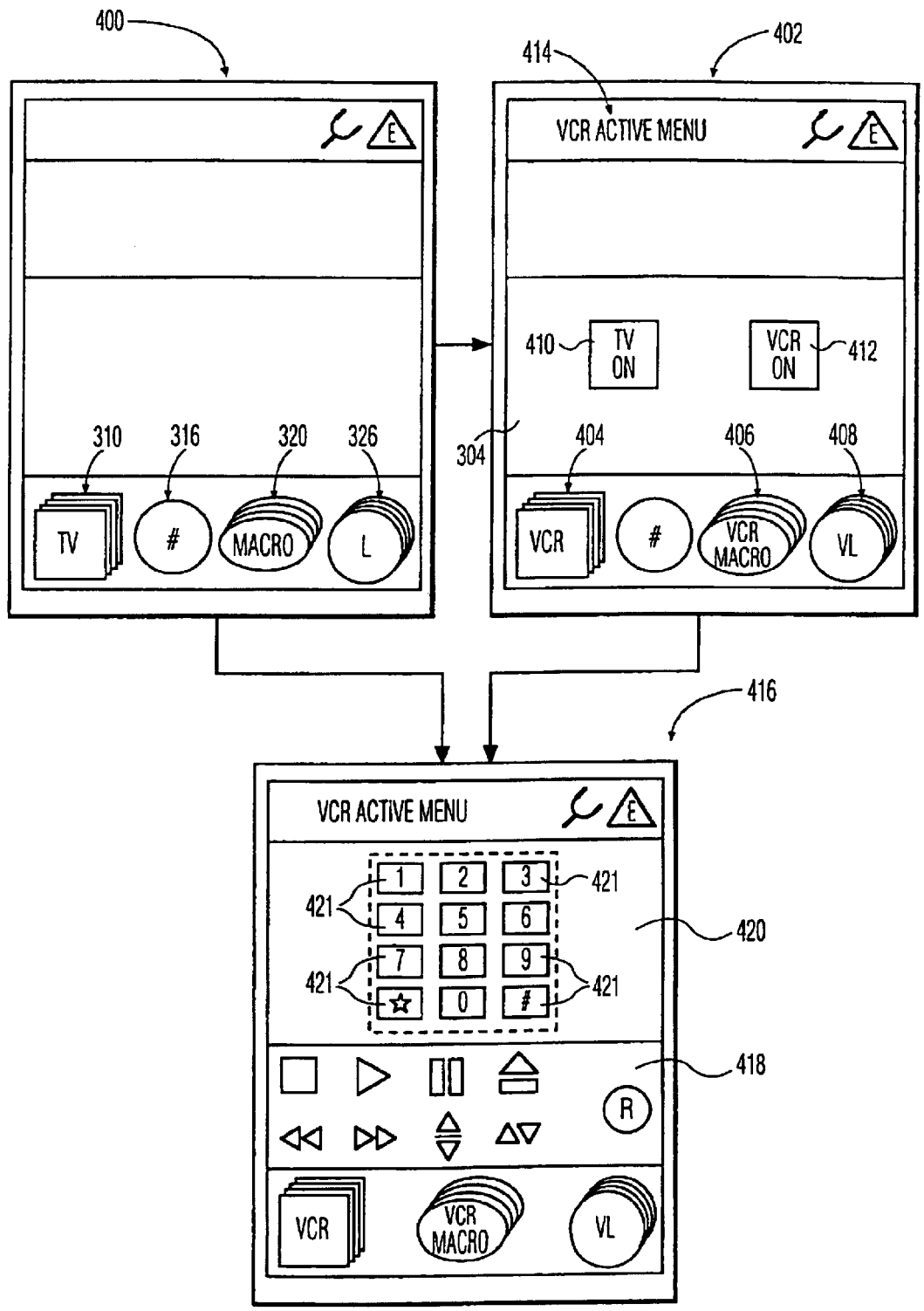
FIG. 4 diagrams example objects and object types.

Referring now to FIG. 4, the screen 100 is shown displaying, in transition, three presentations 400, 402 and 416. For presentation 400 the object types reflect the presentation that was active when the implementing mechanism was last used (e.g., by reference to system state tracking of the tracking subsystem). In this case, the last active environmental device was the TV, as indicated by activation object 310.

Assuming a user selects both the activation object 310 and the VCR tasking object 313/315 thereof, the VCR becomes the active environmental device. Accordingly, the cluster Ad presentation subsystem, in conjunction with the transition subsystem, updates the object types displayed to reflect the active VCR.

Thus, presentation 402 is displayed. Presentation 402 includes a closed navigation object 406 which contains macro objects (not shown) specific to the active VCR. Presentation 402 also includes an environment activation object 403 which contains tasking objects (not shown) specific to the active VCR. Presentation 402 further includes a TV ON tasking object 410 and a VCR ON tasking object 412, both disposed in the lower middle area 304, which objects are displayed because based on the OFF state of both the VCR and TV. Presentation 402 preferably also includes a textual notice of the current state of the tasking system as a text message 414.

If the user selects either the VCR ON tasking object 412, presentation 416 becomes displayed. Presentation 416 includes a plurality of tasking objects associated with tasks that are relevant to the VCR, e.g., to the active environmental device. More specifically, presentation 416 includes a virtual key pad 420 which comprises various tasking objects 421 for selecting channels (of the VCR tuner). In addition, presentation 416 includes a plurality of tasking objects 418 associated with VCR functions/operations, including stop, play, pause, eject, record, fast forward, rewind, settings and channel change up or down. It is to be recognized that displayed object types can be otherwise than as described herein, wherein display of such types preferably is administered by the cluster presentation subsystem, in conjunction with other subsystems of the tasking software system and the resources of the implementing mechanism.

Persons skilled in the art will recognize the foregoing description and embodiments are not limitations, but examples. It will be recognized by persons skilled in the art that many modifications and variations are possible in the details, materials, and arrangements of the parts and steps which have been described and illustrated in order to explain the nature of this invention, and that such modifications and variations do not depart from the spirit and scope of, the teachings and claims contained herein.

What is claimed is:

1. An implementing mechanism, providing for effecting tasks associated with user selection of task-associated objects, and being associated with an environment, the environment comprising one or more environmental devices, the implementing mechanism comprising:
    resources including user interface facilities supporting display of task-associated objects, communication facilities enabling communication with environmental devices, display facilities enabling display of task-associated objects, and input facilities enabling user selection of task-associated object; and
    a tasking software system including a state tracking subsystem, a cluster formulation subsystem, a cluster presentation subsystem and a transition subsystem, wherein
    the state tracking subsystem supports context determination;
    the cluster formulation subsystem formulates clusters, each cluster comprising selected objects, such formulation being responsive to context;
    the cluster presentation subsystem supports the formatting and presentation of task-associated objects of an active cluster responsive to context; and,
    the transition subsystem supports transitions among formats/presentations of an active cluster;
    the tasking software system operating in coordination with the resources so as to display, via the display facilities and responsive to context, clusters of task-associated objects and, by selection of any such object, to enable a user to activate a task respecting one or more environmental devices.

2. The implementing mechanism as claimed in claim 1, wherein the cluster formulation subsystem re-formulates the clusters, responsive to context, and on an adaptive and dynamic basis.

3. The implementing mechanism as claimed in claim 1, wherein the cluster presentation subsystem supports the formatting and presentation of objects, responsive to context and on an adaptive and dynamic basis.

4. The implementing mechanism as claimed in claim 1, wherein the transition subsystem supports transitions among clusters as to active status.

5. The implementing mechanism as claimed in claim 1, wherein the state tracking subsystem supports context determination by gathering data respecting at least one of environmental, device, system and temporal states.

6. The implementing mechanism as claimed in claim 1, wherein the user interface comprises a graphical user interface.

7. The implementing mechanism as claimed in claim 1, wherein the tasking software system further comprises at least one of an object discovery subsystem and a help subsystem.

8. The implementing mechanism as claimed in claim 7, wherein the object discovery subsystem supports the discovery of environmental devices.

9. The implementing mechanism as claimed in claim 7, wherein the object discovery subsystem supports an introduction function, such function enabling communication of "get-to-know-me" information with environmental devices.

10. The implementing mechanism as claimed in claim 1, further comprising collateral software, the collateral software enabling at least one of (a) user recognition and authentication, (b) acquisition and processing of data on ambient environmental states, and (c) acquisition and processing of data respecting the determination of the implementing mechanism's physical position in its environment.

11. The implementing mechanism as claimed in claim 1, wherein the tasking software system comprises distribution facilities, the distribution facilities providing for distribution of one or more functions and operations of the tasking software system and its subsystems over, between or among one or more of a first implementing mechanism, additional implementing mechanisms, one or more environmental devices, one or more other external computing devices, other computer system(s) and network resources.

12. The implementing mechanism as claimed in claim 1, wherein the resources and tasking software system coordinate so as to support tasking of the implementing mechanism by the user selection of objects as displayed by the display facilities or by one or more environmental devices.

13. The implementing mechanism as claimed in claim 12, wherein the resources and tasking system coordinate so as to enable the implementing mechanism to emulate one or more environmental devices.

14. The implementing mechanism as claimed in claim 1, wherein a task-associated object comprises a macro object, such macro object, if selected, being enabled to change a state of one or more environmental devices.

15. The implementing mechanism as claimed in claim 1, wherein a macro object is user defined or system-created from user usage patterns.

16. The device of claim 8, wherein the tasking system is distributed over the device and an external digital processing device.

17. A method implemented on an implementing mechanism comprising the steps of:
    tracking the state of a plurality of environmental devices to determine context relevancy;
    formulating clusters responsive to said context relevancy, each cluster comprising selected task-associated objects;
    presenting a plurality of said task-associated objects via display facilities, each task-associated object corresponding to each of said plurality of environmental devices and being context relevant;
    selecting a task-associated object; and
    executing the one or more tasks associated with the selected task-associated object while maintaining context-relevancy of the presented task-associated objects.

18. The method of claim 17, wherein the tracking step comprises:
polling the plurality of environmental devices to determine, based on response, a current state of the plurality of environmental devices; and
updating the presented task-associated objects to evidence the so-determined current state.

19. The method of claim 17, wherein the executing step comprises:
transmitting a signal to one of said plurality of environmental devices instructing it to change state or implement a set of instructions to effect a change of state; and
updating the presented task-associated objects to reflect the object selection so as to maintain context-relevancy of the presented objects.

20. The method of claim 19, further comprising receiving information from at least one of said environmental devices, so as to determine, based thereon, the physical location of the implementing mechanism, and updating the presentation of said task-associated objects based on the so-determined physical location.

21. An implementing mechanism comprising:
resources including user interface facilities supporting a display of task-associated objects, communication facilities enabling communication with at least one of a plurality of environmental devices, display facilities enabling display of task-associated objects, and input facilities enabling user selection of task-associated objects;
a tasking software system including a state tracking subsystem, a cluster formulation subsystem, and a cluster presentation subsystem, wherein
the state tracking subsystem supports context determination;
the cluster formulation subsystem formulates clusters, each cluster comprising selected objects, said cluster formulation being responsive to said context, and the cluster formulation subsystem reformulates said clusters based on changes in said context;
the cluster presentation subsystem supports the formatting and presentation of task-associated objects of an active cluster responsive to said context; and
the tasking software system operating in coordination with the resources to display via the display facilities and responsive to said context, clusters of task-associated objects and, by selection of any said task-associated object, to enable a user to activate a task respecting at least one of said plurality of environmental devices.

22. An implementing mechanism comprising:
resources including user interface facilities supporting a display of task-associated objects, communication facilities enabling communication with at least one of a plurality of devices, display facilities enabling display of task-associated objects, and input facilities enabling user selection of task-associated objects;
a tasking software system including a state tracking subsystem, a cluster formulation subsystem, and a cluster presentation subsystem, wherein
the state tracking subsystem supports context determination;
the cluster formulation subsystem formulates clusters, each cluster comprising selected objects, said cluster formulation being responsive to said context;
the cluster presentation subsystem supports the formatting and presentation of task-associated objects of an active cluster responsive to said context;
the tasking software system operating in coordination with the resources to display via the display facilities and responsive to said context, clusters of task-associated objects and, by selection of any said task-associated object, to enable a user to activate a task respecting at least one of said plurality of devices; and
a mechanism positioning system for determining the environment position of the implementing mechanism, said mechanism positioning system recognizing changes in the environment of the implementing mechanism, and said mechanism positioning system contributing to the determination of said context for the tasking software system.

23. An implementing mechanism comprising:
resources including user interface facilities supporting a display of task-associated objects;
communication facilities enabling communication with at least one of a plurality of environmental devices, display facilities enabling display of task-associated objects, and input facilities enabling user selection of task-associated objects;
a tasking software system including a state tracking subsystem, a cluster formulation subsystem, and a cluster presentation subsystem, wherein
the state tracking subsystem supports context determination, said context determination including detecting changes in ambient physical conditions;
the cluster formulation subsystem formulates clusters, each cluster comprising selected objects, said cluster formulation being responsive to said context;
the cluster presentation subsystem supports the formatting and presentation of task-associated objects of an active cluster responsive to said context; and
the tasking software system operating in coordination with the resources to display via the display facilities and responsive to said context, clusters of task-associated objects and, by selection of any said task-associated object, to enable a user to activate a task respecting at least one of said environmental devices.

24. An implementing mechanism comprising:
resources including user interface facilities supporting a display of task-associated objects;
communication facilities enabling communication with at least one of a plurality of environmental devices, display facilities enabling display of task-associated objects, and input facilities enabling user selection of task-associated objects;
a tasking software system including a state tracking subsystem, a cluster formulation subsystem, and a cluster presentation subsystem wherein
the state tracking subsystem supports context determination, wherein said context determination includes using at least one algorithm capable of changing a context determination:
the cluster formulation subsystem formulates clusters, each cluster comprising selected objects, said cluster formulation being responsive to said context;
the cluster presentation subsystem supports the formatting and presentation of task-associated objects of an active cluster responsive to said context; and
the tasking software system operating in coordination with the resources to display via the display facilities and responsive to said context, clusters of task-associated objects and, by a selection of any said task-associated object to enable a user to activate a task respecting at least one of said plurality of environmental devices.

25. An implementing mechanism comprising:

resources including user interface facilities supporting a display of task-associated objects, communication facilities enabling communications with at least one of a plurality of environmental devices, display facilities enabling display of task-associated objects, and input facilities enabling user selection of task-associated objects;

a tasking software system including a state tracking subsystem, a cluster formulation subsystem, and a cluster presentation subsystem, wherein the state tracking subsystem supports context determination, wherein said context determination includes monitoring historical usage patterns of a user;

the cluster formulation subsystem formulates clusters, each cluster comprising selected objects, said cluster formulation being responsive to said context;

the cluster presentation subsystem supports the formatting and presentation of task-associated objects of an active cluster responsive to said context; and the tasking software system operating in coordination with the resources to display via the display facilities and responsive to said context, clusters of task-associated objects and, by selection of any said task-associated object, to enable a user to activate a task respecting at least one of said plurality of environmental devices.

26. An implementing mechanism comprising:

resources including user interface facilities supporting a display of task-associated objects, communication facilities enabling communications with at least one of a plurality of environmental devices, display facilities enabling display of task-associated objects, and input facilities enabling user selection of task-associated objects;

a tasking software system including a state tracking subsystem, a cluster formulation subsystem, and a cluster presentation subsystem, wherein the state tracking subsystem supports context determination;

the cluster formulation subsystem formulates clusters, each cluster comprising selected objects, said cluster formulation being responsive to said context and said cluster formulation operating substantially continuously;

the cluster presentation subsystem supports the formatting and presentation of task-associated objects of an active cluster responsive to said context; and the tasking software system operating in coordination with the resources to display via the display facilities and responsive to said context, clusters of task-associated objects and, by selection of any said task-associated object, to enable a user to activate a task representing at least one of said plurality of environmental devices.

27. An implementing mechanism comprising:

resources including user interface facilities supporting a display of task-associated objects, communication facilities enabling communications with at least one of a plurality of environmental devices and supporting the TCP/IP connectivity standard, display facilities enabling display of task-associated objects, and input facilities enabling user selection of task-associated objects;

a tasking software system including a state tracking subsystem, a cluster formulation subsystem, and a cluster presentation subsystem, wherein the state tracking subsystem supports context determination;

the cluster formulation subsystem formulates clusters, each cluster comprising selected objects, said cluster formulation being responsive to said context;

the cluster presentation subsystem supports the formatting and presentation of task-associated objects of an active cluster responsive to said context; and the tasking software system operating in coordination with the resources to display via the display facilities and responsive to said context, clusters of task-associated objects and, by selection of any said task-associated object, to enable a user to activate a task representing at least one of said plurality of environmental devices.

28. The implementing mechanism of claim 27, further comprising:

a help subsystem supporting interaction with the tasking software system.

29. The implementing mechanism of claim 28, wherein the help subsystem is configured to support user interaction with the tasking software system by analyzing user's configuring preferences against at least one of said existing clusters and identifying conflicts between said user's configuring preferences and at least one of said existing clusters.

30. The implementing mechanism of claim 27, wherein said display facilities include a touch-sensitive LCD.

* * * * *